US011011016B2

(12) United States Patent
Nelson

(10) Patent No.: US 11,011,016 B2
(45) Date of Patent: May 18, 2021

(54) SYSTEMS AND METHODS FOR PROVIDING GAMING CONTENT SYNCHRONIZED WITH STREAMING VIDEO CONTENT

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 143 days.

(21) Appl. No.: 16/110,431

(22) Filed: Aug. 23, 2018

(65) Prior Publication Data

US 2020/0066088 A1   Feb. 27, 2020

(51) Int. Cl.
H04N 21/43      (2011.01)
H04N 21/431     (2011.01)
H04N 21/41      (2011.01)
H04N 21/8547    (2011.01)
H04N 21/44      (2011.01)
H04N 21/81      (2011.01)
G07F 17/32      (2006.01)

(52) U.S. Cl.
CPC ........ *G07F 17/323* (2013.01); *G07F 17/3211* (2013.01); *G07F 17/3288* (2013.01); *H04N 21/4122* (2013.01); *H04N 21/4307* (2013.01); *H04N 21/4312* (2013.01); *H04N 21/44008* (2013.01); *H04N 21/8173* (2013.01); *H04N 21/8547* (2013.01); *G07F 17/3206* (2013.01); *G07F 17/3209* (2013.01); *G07F 17/3213* (2013.01); *G07F 17/3239* (2013.01); *G07F 17/3255* (2013.01)

(58) Field of Classification Search
None
See application file for complete search history.

(56) References Cited

U.S. PATENT DOCUMENTS

| 8,821,274 | B2 | 9/2014 | Lyons et al. |
| 9,269,222 | B2 | 2/2016 | Froy et al. |
| 2003/0119576 | A1 | 6/2003 | McClintic et al. |
| 2008/0311971 | A1 | 12/2008 | Dean |
| 2011/0028207 | A1* | 2/2011 | Gagner ................... G07F 17/32 463/25 |
| 2012/0094737 | A1* | 4/2012 | Barclay ............... G07F 17/3213 463/20 |
| 2013/0059650 | A1 | 3/2013 | Sylla et al. |
| 2014/0090001 | A1* | 3/2014 | Das .................... H04N 21/4722 725/112 |

* cited by examiner

*Primary Examiner* — James S. McClellan
*Assistant Examiner* — Peter J Iannuzzi
(74) *Attorney, Agent, or Firm* — Sage Patent Group

(57) ABSTRACT

Systems and methods for providing gaming content that is synchronized with streaming video content are disclosed. A time at which a predetermined portion of streaming video content will be displayed to a user on a display device is determined by a processing device. Based on the determined time, game content that is associated with the predetermined portion of the streaming video content is selected by the processing device. The game content is then displayed to the user on a display device, which may be a different display device that the display device that is displaying the streaming video content, or which may be the same display device. The displayed game content is synchronized with displaying the predetermined portion of the streaming video content.

20 Claims, 12 Drawing Sheets

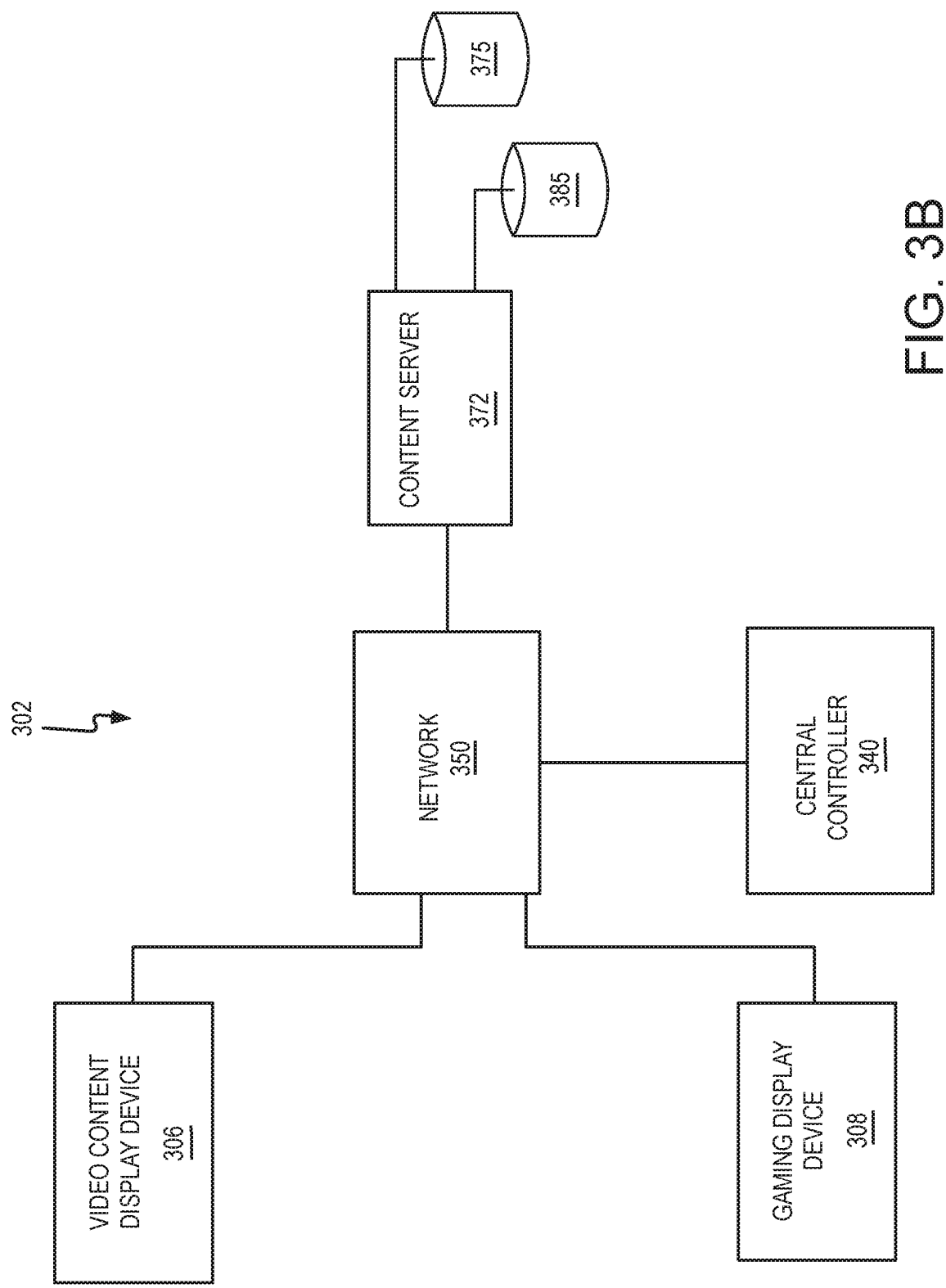

SYSTEMS AND METHODS FOR PROVIDING GAMING CONTENT SYNCHRONIZED WITH STREAMING VIDEO CONTENT

BACKGROUND

Embodiments described herein relate to systems and methods for providing gaming content, and in particular for providing gaming content synchronized with streaming video content. Electronic gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three-dimensional display screens.

BRIEF SUMMARY

Embodiments described herein relate to systems and methods for providing gaming content, and in particular for providing gaming content synchronized with streaming video content. According to some embodiments, a time at which a predetermined portion of streaming video content will be displayed to a user on a display device is determined by a processing device. Based on the determined time, game content that is associated with the predetermined portion of the streaming video content is selected by the processing device. The game content is then displayed to the user on a display device, which may be a different display device that the display device that is displaying the streaming video content, or which may be the same display device. The displayed game content is synchronized with displaying the predetermined portion of the streaming video content.

According to some embodiments, a computer-implemented method is disclosed. The method includes determining, via a processing device, a time at which a predetermined portion of streaming video content will be displayed to a user. The method further includes selecting, via the processing device, game content based on the determining the time, the game content associated with the predetermined portion of the streaming video content. The method further includes displaying the game content to the user on a first display device, wherein displaying the game content is synchronized with displaying the predetermined portion of the streaming video content.

According to some embodiments, a gaming device is disclosed. The gaming device includes a processing circuit, a display device, and a memory coupled to the processing circuit. The memory includes machine-readable instructions that, when executed by the processing circuit, cause the processing circuit to determine a time at which a predetermined portion of streaming video content will be displayed to a user. The memory further includes machine-readable instructions that, when executed by the processing circuit, cause the processing circuit to select game content based on the time, the game content associated with the predetermined portion of the streaming video content. The memory further includes machine-readable instructions that, when executed by the processing circuit, cause the game content to be displayed to the user on the display device, wherein displaying the game content is synchronized with displaying the predetermined portion of the streaming video content.

According to some embodiments, a gaming system is disclosed. The gaming system includes a processing circuit and a memory coupled to the processing circuit. The memory includes machine-readable instructions that, when executed by the processing circuit, cause the processing circuit to determine a time at which a predetermined portion of streaming video content will be displayed to a user. The memory further includes machine-readable instructions that, when executed by the processing circuit, cause the processing circuit to select game content based on the time, the game content associated with the predetermined portion of the streaming video content. The memory further includes machine-readable instructions that, when executed by the processing circuit, cause the game content to be displayed to the user on a display device, wherein displaying the game content is synchronized with displaying the predetermined portion of the streaming video content.

BRIEF DESCRIPTION OF THE DRAWINGS

FIGS. 3A and 3B are schematic block diagrams illustrating network configurations including a content server providing streaming video content and synchronized gaming content at one or more display devices according to some embodiments.

DETAILED DESCRIPTION

Embodiments described herein relate to systems and methods for providing gaming content, and in particular for providing gaming content synchronized with streaming video content. According to some embodiments, a time at which a predetermined portion of streaming video content will be displayed to a user on a display device is determined by a processing device. Based on the determined time, game content that is associated with the predetermined portion of the streaming video content is selected by the processing device. The game content is then displayed to the user on a display device, which may be a different display device that the display device that is displaying the streaming video content, or which may be the same display device. The displayed game content is synchronized with displaying the predetermined portion of the streaming video content.

Advantages of this and other arrangements include the ability of viewers of the streaming video content to enhance their experience by also playing a game that includes content that is relevant to and synchronized with the streaming video content. One technical problem associated with conventional streaming video arrangements is that secondary activities performed at the same time, such as gaming activity, generally do not have relevance to the streaming video content. Technical solutions to this problem provided by embodiments disclose herein include synchronizing gaming content with the streaming video content, which provides customized gaming content, such as a gaming experience that includes content that is tailored to events occurring within the streaming video content, to users who may not be interested in a traditional gaming experience, e.g., at a dedicated EGM in a casino environment.

Figure 1:
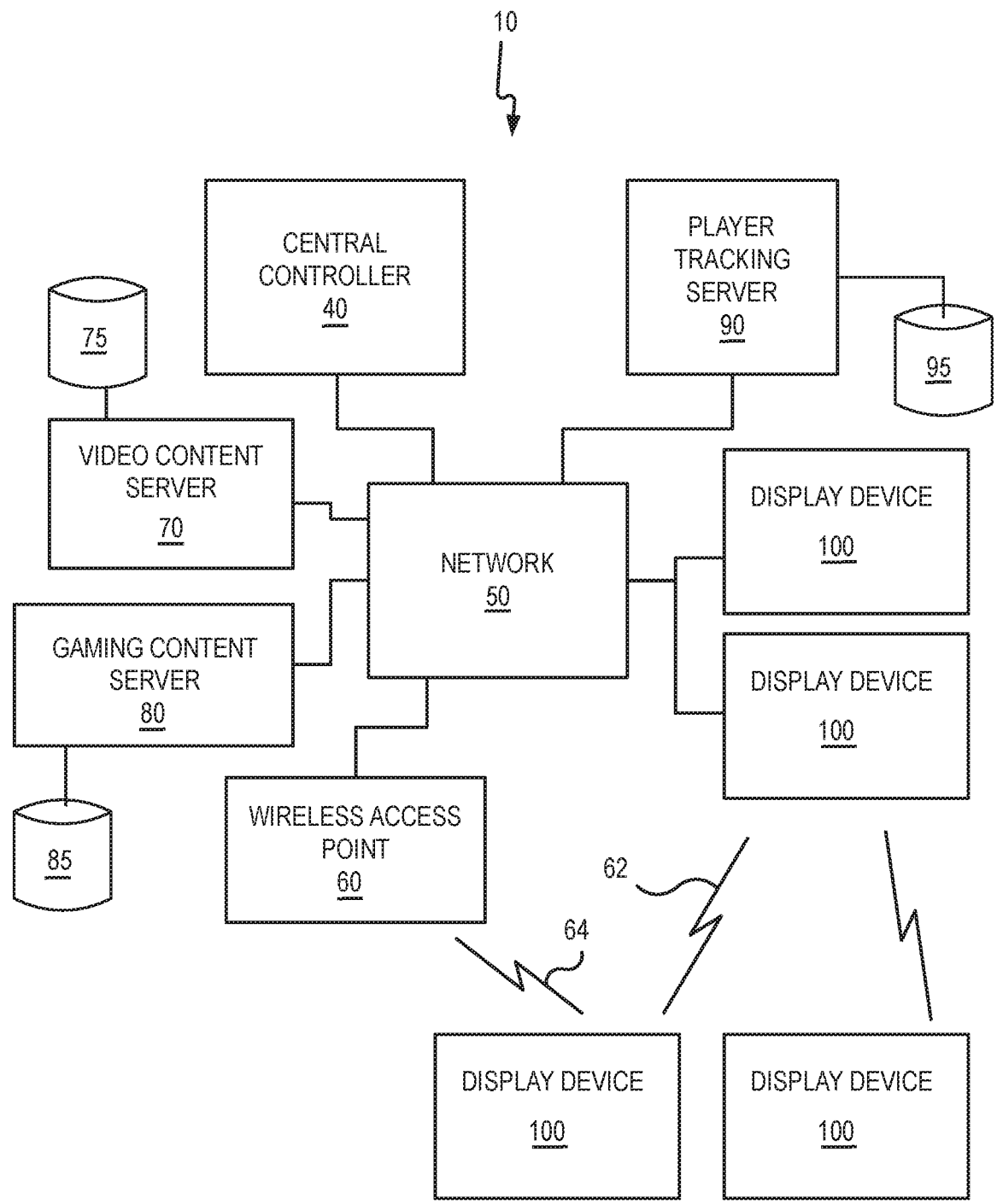
FIG. 1 is a schematic block diagram illustrating a network configuration for a plurality of gaming and/or content display devices according to some embodiments.

Referring to FIG. 1, a system 10 including a plurality of display devices 100 is illustrated. The system 10 may be located, for example, on the premises of a gaming establishment, such as a casino, in a private residence, or may include components that are located at different locations. The display devices 100 may be in communication with each other and/or a central controller 40 through a data network or remote communication link 50. The data communication network 50 may be a private data communication network that is operated, for example, by the gaming facility that operates the display device 100, a publicly accessible data communication network such as the Internet, or a combination thereof. Communications over the data communication network 50 may be encrypted for security. The central controller 40 may be any suitable server or computing device which includes at least one processing circuit, such as a processor, and at least one memory or storage device. Each display device 100 may include a processing circuit that transmits and receives events, messages, commands or any other suitable data or signal between the display device 100 and the central controller 40 and/or other display devices 100. The display device processor is operable to execute such communicated events, messages or commands in conjunction with the operation of the display device. Moreover, the processor of the central controller 40 is configured to transmit and receive events, messages, commands or any other suitable data or signal between the central controller 40 and each of the individual display devices 100. In some embodiments, one or more of the functions of the central controller 40 may be performed by one or more display device processors. Moreover, in some embodiments, one or more of the functions of one or more display device processors as disclosed herein may be performed by the central controller 40.

A wireless access point 60 provides wireless access to the data communication network 50. The wireless access point 60 may be connected to the data communication network 50 as illustrated in FIG. 1, or may be connected directly to the central controller 40 or another server connected to the data communication network 50.

One or more content servers, such as a video content server 70 and a gaming content server 80, may also be connected through the data communication network 50. The streaming video content server 70 may manage delivery of the streaming video content to a user of a display device 100. The streaming video content may be stored in a video content database 75. Similarly, the gaming content server may manage delivery of the gaming content to the user of a display device 100. The gaming content may be stored in a gaming content database 85. The video content server 70 and a gaming content server 80 may be implemented within or separately from each other. The video content server 70 and a gaming content server 80 may also be implemented within or separately from the central controller 40.

A player tracking server 90 may also be connected through the data communication network 50. The player tracking server 90 may manage a player tracking account that tracks the gameplay and spending and/or other player preferences and customizations of a player, i.e., the user of the display device 100, manages loyalty awards for the player, manages funds deposited or advanced on behalf of the player, and other functions. Player information managed by the player tracking server 90 may be stored in a player information database 95.

The display devices 100 communicate with one or more elements of the system 10 to coordinate providing streaming video content and synchronized gaming content. For example, in some embodiments, a display device 100 may communicate directly with another display device 100 over a wireless interface 62, which may be a WiFi link, a Bluetooth link, an NFC link, etc. In other embodiments, the display device 100 may communicate with the data communication network 50 (and devices connected thereto, including EGMs) over a wireless interface 64 with the wireless access point 160. The wireless interface 64 may include a WiFi link, a Bluetooth link, an NFC link, etc. In still further embodiments, the display device 100 may communicate other display devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the display devices 100 and/or central controller 40 to coordinate providing streaming video content and synchronized gaming content to the display device(s) 100.

In some embodiments, the central controller 40, video content server 70 and/or gaming content server 80 may coordinate the generation and display of the streaming video content and the synchronized gaming content to more than one user and/or to more than one display device 100. As described in more detail below, this may enable multiple users to interact with the same streaming video content and/or gaming content in real time. This feature can be used to provide a shared multiplayer experience to multiple users at the same time. Moreover, in some embodiments, the central controller 40, video content server 70 and/or gaming content server 80 may coordinate the generation and display of the streaming video content and the synchronized gaming content to users at different physical locations.

Figure 2A:
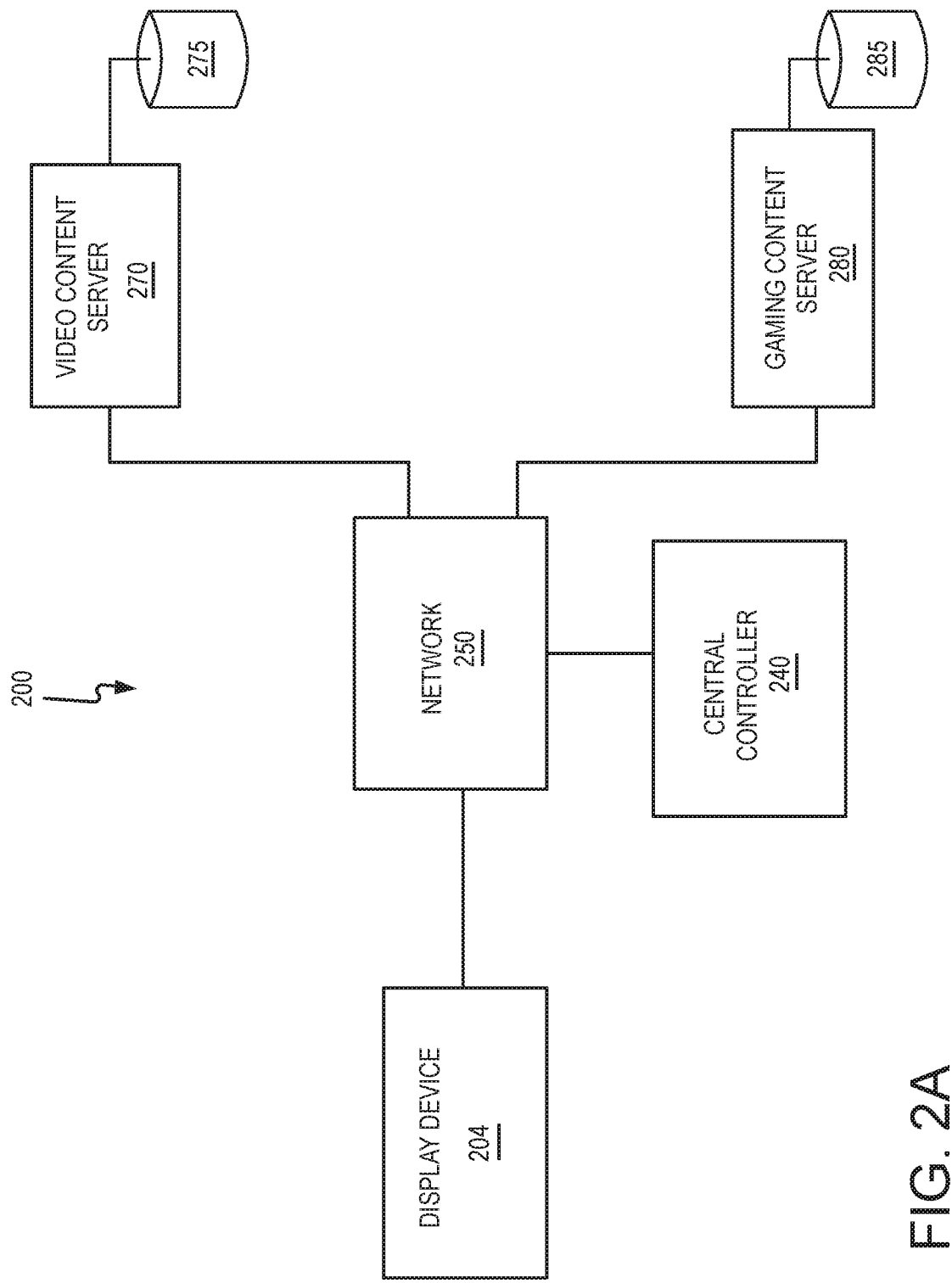
FIGS. 2A and 2B are schematic block diagrams illustrating network configurations including a streaming video content server and a gaming content server providing streaming video content and synchronized gaming content at one or more display devices according to some embodiments.
Figure 2B:
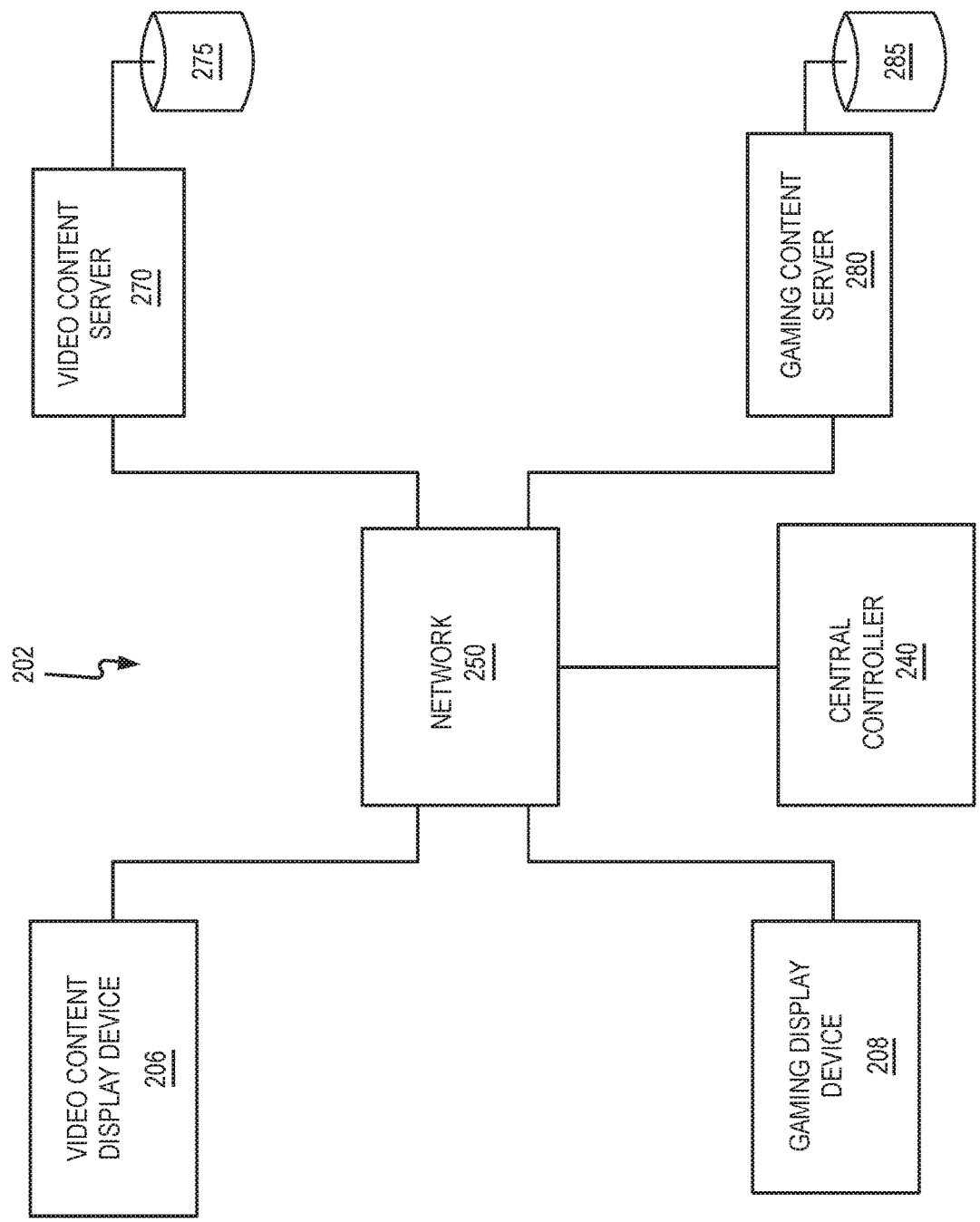

Referring now to FIGS. 2A and 2B, schematic block diagrams illustrating network configurations for systems 200, 202 including a streaming video content server 270 and a gaming content server 280 are disclosed. Referring now to FIG. 2A, a system 200 includes a display device 204 and a central controller 240 for providing streaming video content and gaming content to a user via the display device 204. In this example, the display device 204 is connected to the central controller 240 via a network 250, but it should be understood that the central controller 240 in some embodiments may be part of the display device 204 or may be connected to the display device 204 via a direct wired or wireless connection as well. A video content server 270 and a gaming content server 280 are also connected to the central controller 240 via the network 250 in this example.

In the embodiment of FIG. 2A, a processing device of the central controller 240 determines a time at which a predetermined portion of streaming video content will be displayed to a user of the display device 204. For example, the video content can retrieve streaming video content from the video content database 275 and transmit the streaming video content, directly or indirectly, to the display device 204. The central controller 240 can inspect or observe the data stream being transmitted to the display device 204 or, alternatively, the video content server 270 can first transmit to the central controller 240 a signal and/or data stream containing or associated with the streaming video content or a portion thereof. The central controller can then analyze the data stream to determine the time at which the predetermined portion of streaming video content will be displayed to a user of the display device 204. In another embodiment, the display device 204 can transmit a signal and/or data stream containing or associated with the streaming video content or a portion thereof.

Next, the processing device of the central controller 240 selects game content based on the determined time. In this example, the game content is associated with the predetermined portion of the streaming video content so that the game content has relevance to the portion of the streaming video content. It should be understood that the video content and the game content may be provided separately, from different providers, or may be provided by a common provider, as desired. In some embodiments, the video content and the gaming content can be synchronized in advance and may also be provided on a common data stream, as desired.

In this example, the central controller 240 causes the gaming content server 280 to retrieve the selected game content from the gaming content database 285 and transmit, directly or indirectly, the gaming content to the display device 204, where the gaming content is displayed to the user. The central controller 240 synchronizes the delivery and/or display of the gaming content with the delivery and/or display of the streaming video content on the display device 204 so that the gaming content is displayed to the user at the same time or timeframe as the associated predetermined portion of the streaming video content.

Referring now to FIG. 2B, an alternative system 202 includes a video content display device 206 for displaying the streaming video content to the user and gaming display device 208 for displaying the gaming video content to the same user. For example, the video content display device 206 may be a stationary device such as a television or computer monitor, or may be a mobile device such as laptop computer screen, tablet computer, mobile phone, or an augmented reality (AR) device such as a headset glasses or contact lens. The gaming display device 208 in this example is a separate display device and may similarly be a stationary or mobile device of the same or different type as the video content display device 206. In this example, both the video content display device 206 and the gaming display device 208 are connected to the central controller 240 via a network 250, but it should be understood that the central controller 240 in some embodiments may be part of the video content display device 206 and/or gaming display device 208 or may be connected to the video content display device 206 and/or gaming display device 208 via a direct wired or wireless connection as well. As with the system 200 of FIG. 2A, a video content server 270 and a gaming content server 280 are also connected to the central controller 240 via the network 250 in this example.

In this example, it is not necessary for the video content display device 206 to be connected to and/or controlled by the central controller 240, because the central controller 240 may have the ability to determine when a portion of the streaming video content will be displayed on the video content display device 206 without directly receiving, inspecting, and/or observing the data stream containing the streaming video content. For example, the central controller 240 could receive a signal and/or data stream from the video content server 270, the video content display device 206, or the gaming display device 208 (which may also be in communication with the other components of the system 202) indicative of the time that the predetermined portion of the streaming video content will be displayed to the user. Similar to the system 200 of FIG. 2A, the central controller 240 in this example synchronizes the delivery and/or display of the gaming content to the gaming display device 208 with the delivery and/or display of the streaming video content on the video content display device 206 so that the gaming content is displayed to the user at the same time or timeframe as the associated predetermined portion of the streaming video content.

Figure 3A:
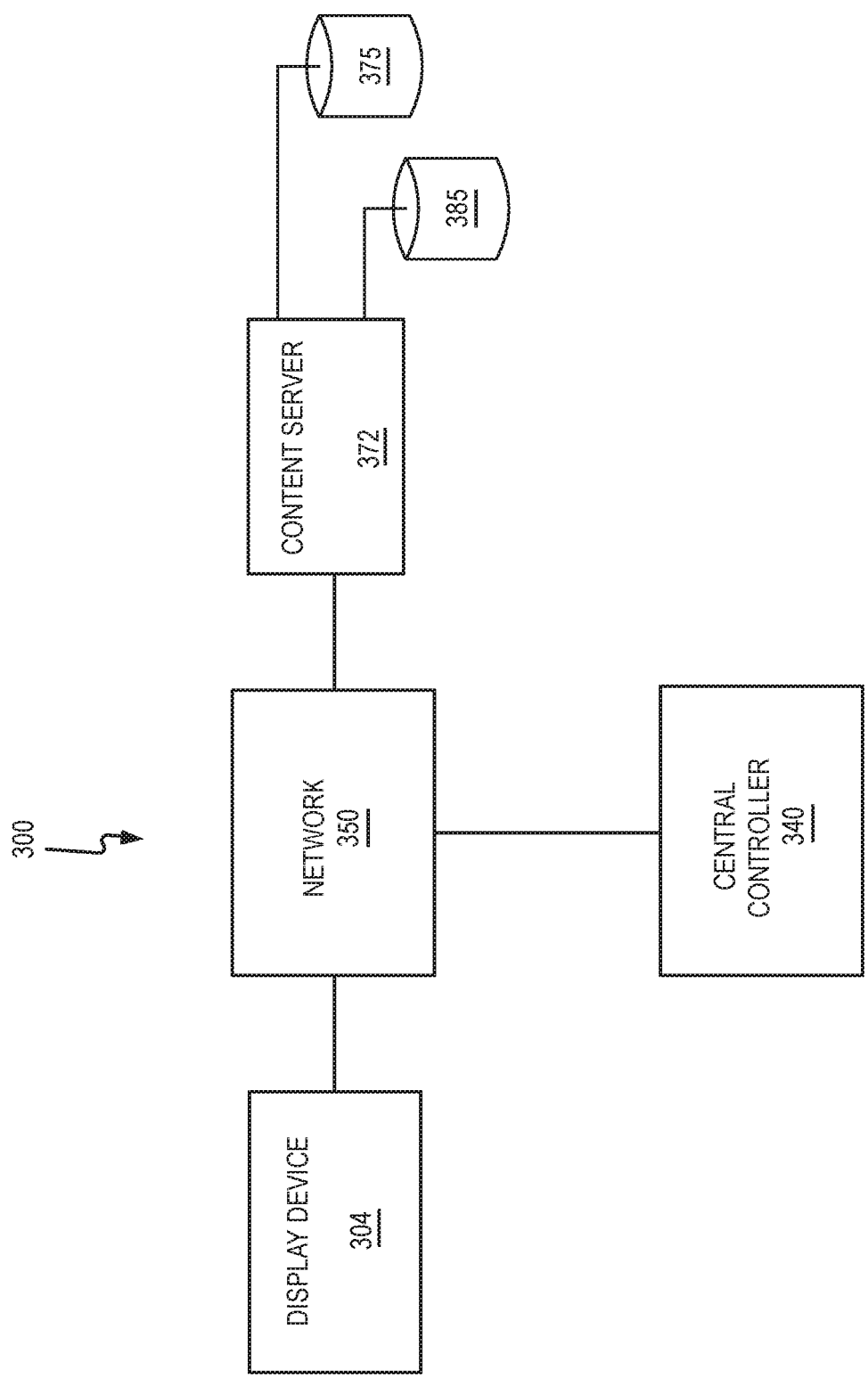

In the examples of FIGS. 2A and 2B, the video content server 270 and the gaming content server 280 are separate components of the systems 200, 202, it is also for the streaming video content and the gaming content to be provided from a common server on the system. In this regard, FIGS. 3A and 3B illustrate schematic block diagrams of systems 300, 302 including a common content server 372 for providing streaming video content and synchronized gaming content. As shown in FIG. 3A, a system 300 includes a display device 304 and central controller 340 connected to each other via a network 350, similar to the system 200 of FIG. 2A above. In the example of FIG. 3A, however, a common content server 372 retrieves both the video content from a video content database 375 and the gaming content from a gaming content database 385 and provides the streaming video content and the gaming content, directly or indirectly, to the display device 304. It should be understood that in this and other embodiments, the functions of the central controller 340 may also be included in the content server 372 and/or the display device 304, as desired.

Referring now to FIG. 3B, an alternative system 302 includes a video content display device 206 for displaying the streaming video content to the user and gaming display device 208 for displaying the gaming video content to the same user, similar to the system 202 of FIG. 2B above. In this example, the video content display device 306 and the gaming display device 308 are connected to the central controller 340 via a network 350, and as with the system 300 of FIG. 2A, a common content server 372 is also connected to the central controller 340, the video content display device 306, and the gaming display device 308 via the network 350.

Figure 4:
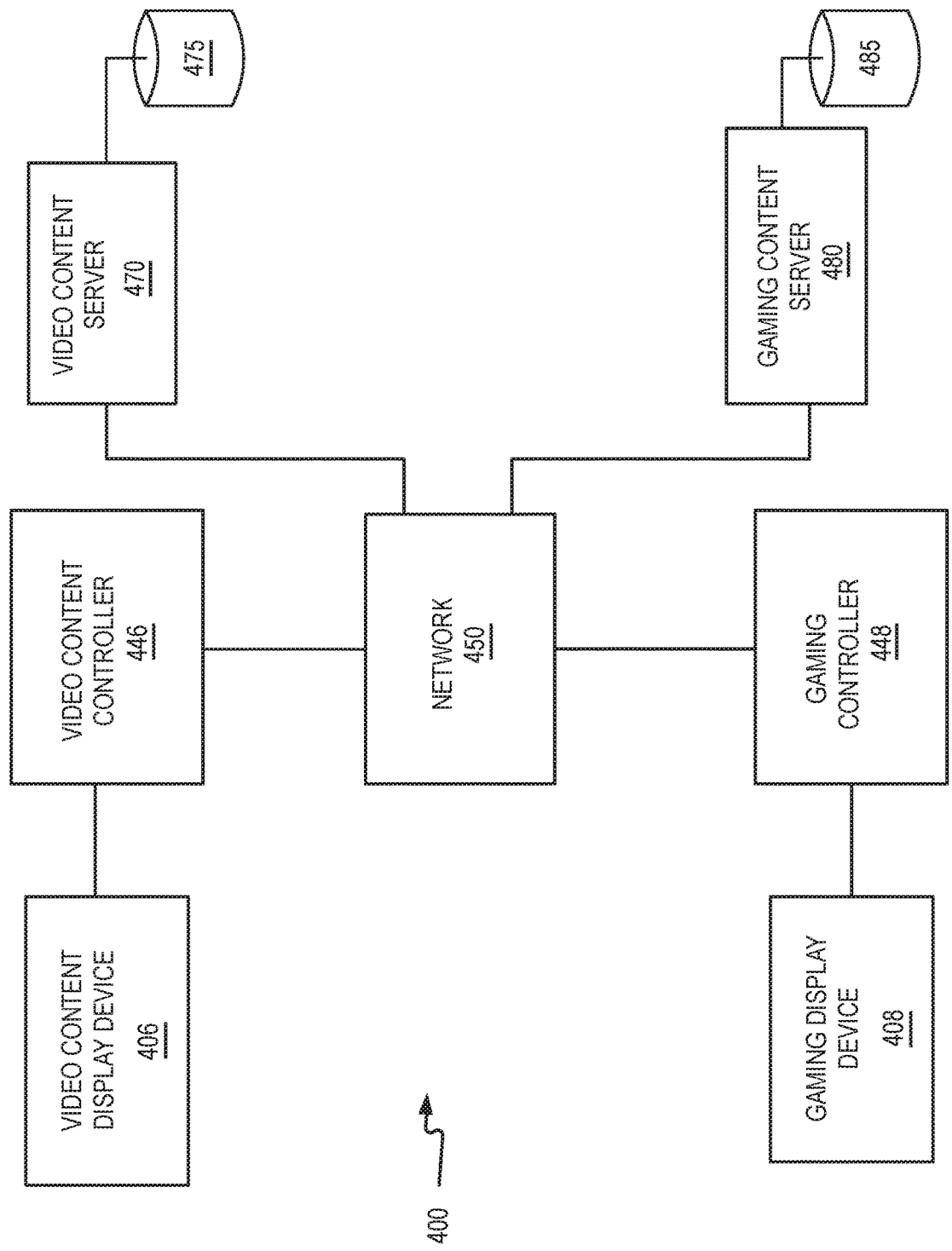
FIG. 4 is a schematic block diagram illustrating a network configurations including a streaming video content controller for providing streaming video content at a content display device and a gaming controller for providing synchronized gaming content at a gaming display device according to some embodiments.

It should also be understood that it is not necessary to centralize control of functions described herein in a single central controller. In this regard, FIG. 4 is a schematic block diagram illustrating a system 400 having a video content controller 446 providing streaming video content at a content display device 406 and a separate gaming controller 448 for providing synchronized gaming content at a gaming display device 408 according to some embodiments. The video content controller 446 in this example is connected to a video content server 470 via a network 450, but it should be understood that the video content controller 446 may be directly connected to or embodied in the video content server 470, as desired. Similarly, the gaming controller 448 in this example is connected to a gaming content server 480 via the network 450, and it should likewise be understood that the gaming controller 448 may be directly connected to or embodied in the gaming content server 480, as well.

Figure 5:
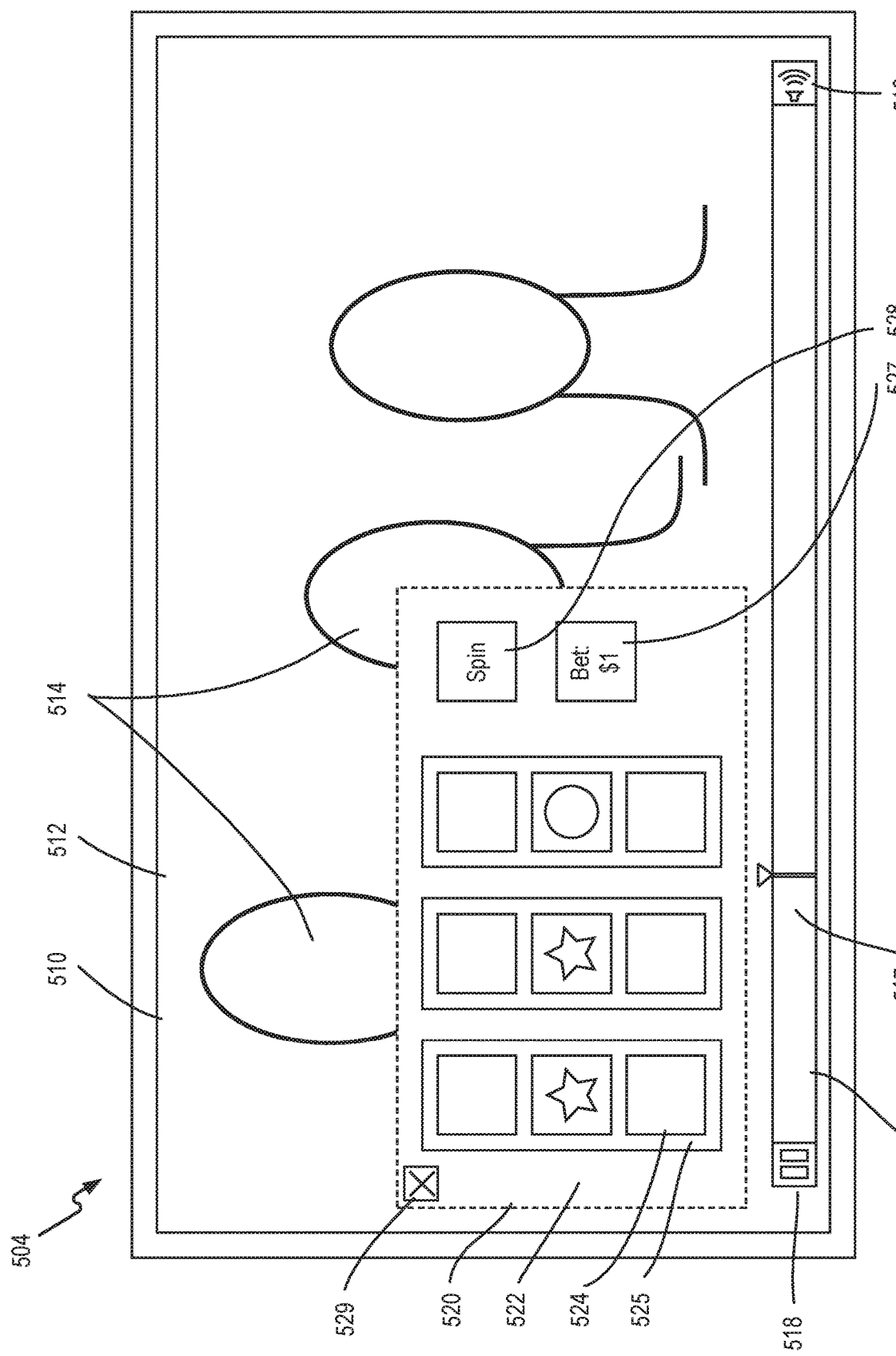
FIG. 5 is a diagram of a graphical user interface for a display device including streaming video content overlaid with synchronized gaming content on a common display according to some embodiments.

The streaming video content and synchronized gaming content may be displayed to the user of the display device(s) in a number of ways. In this regard, FIG. 5 is a diagram of a graphical user interface for a display device including streaming video content overlaid with synchronized gaming content on a common display according to some embodiments. In this embodiment, streaming video content 510 and synchronized game content 520 is provided simultaneously on a common display device 504, similar to the embodiments discussed above with respect to FIGS. 2A and 3A, for example. The streaming video content 510 includes a full screen video window 512 that contains streaming video images 514 and may also include additional graphical user interface elements 516 such as a progress slider 517 for scrubbing to a particular portion of the streaming video content 510, a play/pause button 518 for playing or pausing the streaming video content 510, a volume slider 519 for adjusting playback volume, etc. In this example, the gaming content 520 is contained in an overlay gaming window 522 that overlays a portion of the streaming video window 512. In this example, the overlay gaming window 522 may be sized to minimize obstruction of the streaming video image 514 portion of the streaming video content 510. The overlay gaming window may include static or animated gaming elements 524, such as slot machine reels 525 or other elements, and may also contain other graphical user interface elements such as a wager button 527 for setting a wager amount, a spin/play button 528 for initiating play of the wagering game, and a dismiss/close button 529 to dismiss or close the gaming window 522 if the user does not wish to play, etc.

Figure 6:
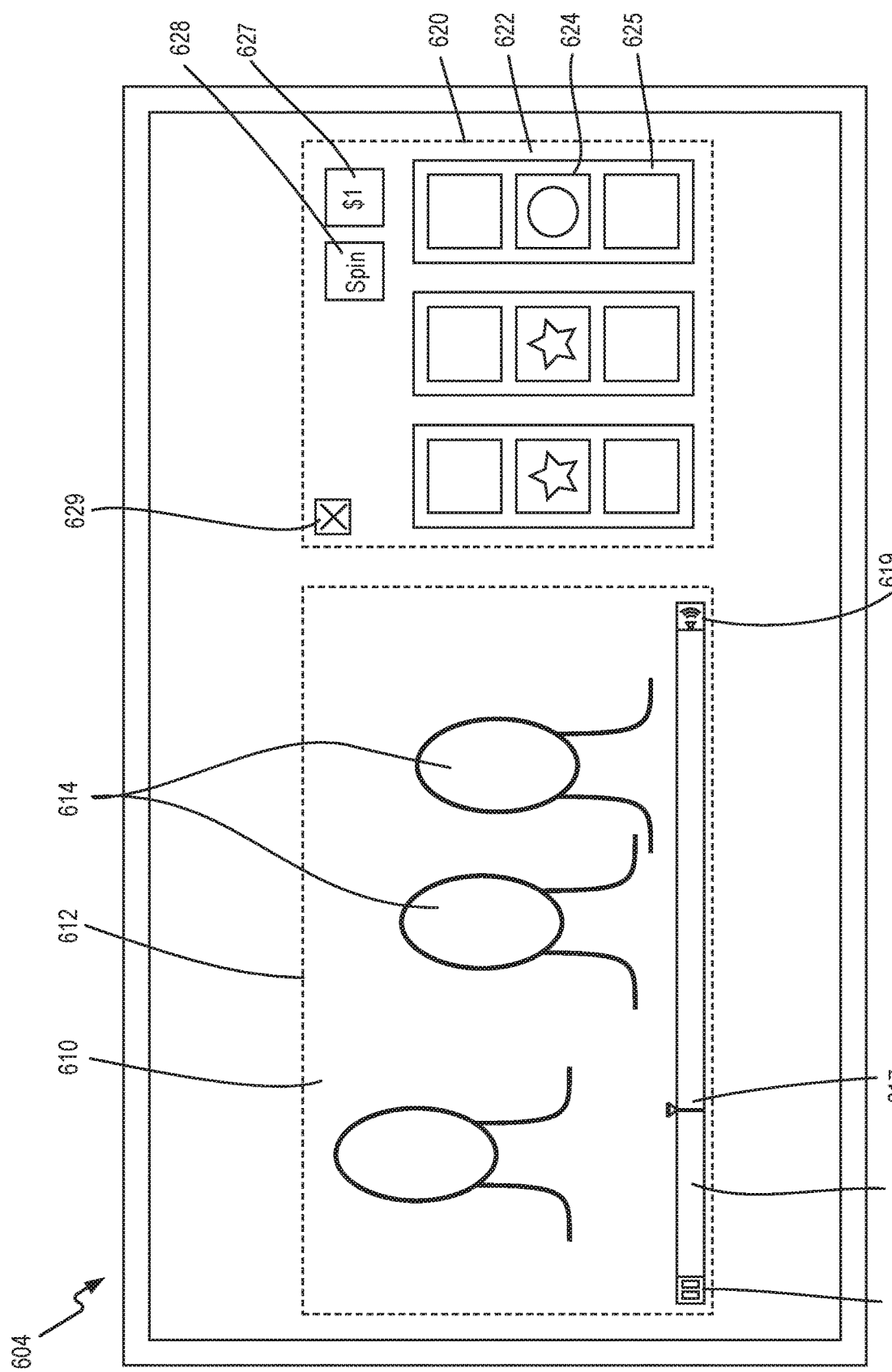
FIG. 6 is a diagram of a graphical user interface for a display device including streaming video content displayed side-by-side with synchronized gaming content on a common display according to some embodiments.

In some embodiments, it may be desirable to display the streaming video content and gaming content in non-overlapping windows on a common display. In this regard, FIG. 6 is a diagram of a graphical user interface for a display device 604 including streaming video content 610 displayed side-by-side with synchronized gaming content 620. In this example, the video window 612, which contains the streaming video images 614 and additional graphical user interface elements 616 (e.g., progress slider 617, play/pause button 618 and/or volume slider 619) and the gaming window 622, which contain the gaming elements 624 (e.g., slot machine reels 625) and additional graphical user interface elements (e.g., wager button 627, spin/play button 628, dismiss/close button 629) are sized so that they can be displayed side-by-side on the display device 604 and do not overlap each other. In some examples, display of the gaming window 622 may cause the video window 612 to reduce in size from a full screen mode to the reduced size video window 612. Selecting the dismiss/close button 629 causes the gaming window 622 to disappear and may also cause the video window to increase in size back to a full-screen mode.

Figure 7:
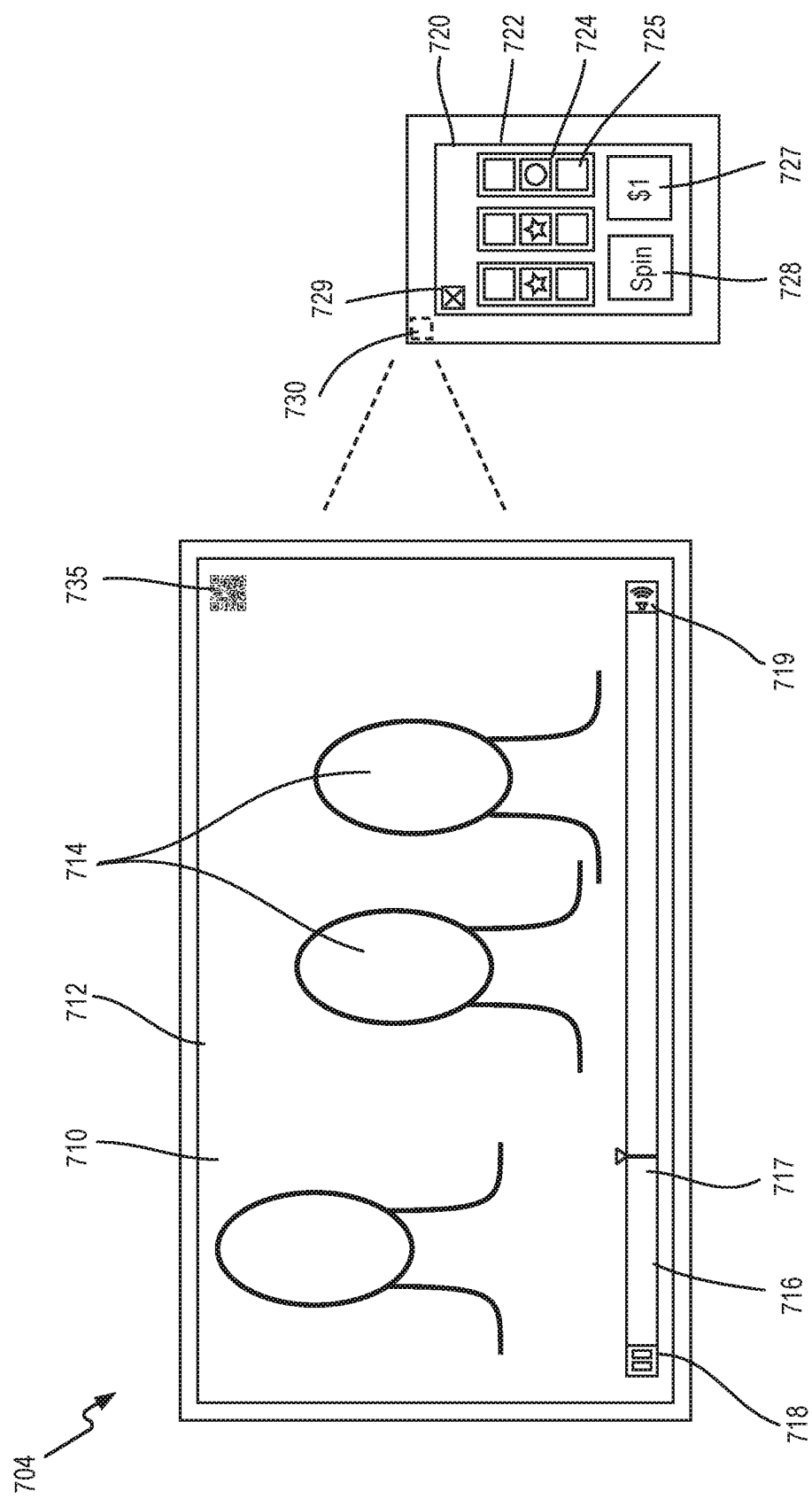
FIG. 7 is a diagram of a graphical user interface for a content display device including streaming video content and a graphical user interface for a gaming display device including synchronized gaming content according to some embodiments.

As discussed above, in some embodiments, the streaming video content and the gaming content may be displayed on different screens or display devices. In this regard, FIG. 7 is a diagram of graphical user interfaces for a video content display device 704 including streaming video content 710 and a separate gaming display device 708 with synchronized gaming content 720. In this example, the video content display device 706 is a television display, and the gaming display device 708 is a mobile computing device, such as a tablet, but as discussed above, any combination of display devices may be used. In this embodiment the video window 712, which contains the streaming video images 714 and additional graphical user interface elements 716 (e.g., progress slider 717, play/pause button 718 and/or volume slider 719) is a full screen window on the video content display device 706, and the gaming window 722, which contain the gaming elements 724 (e.g., slot machine reels 725) and additional graphical user interface elements (e.g., wager button 727, spin/play button 728, dismiss/close button 729) is a full screen window on the gaming display device 708.

In some embodiments, the gaming display device 708 may determine the time by identifying an image contained in a frame of the streaming video content associated with the time. For example, a camera 730 may generate a live video signal of a scene that includes the frame of the streaming video content so that the image can be identified based on the live video signal. In this example, the image in the particular frame is an optical code 735 representative of code data indicative of the time. The code 735 may be provided in a way that is detectable by the camera 730 but that may be undetectable or inconspicuous to the user, such as a cue mark or optical code displayed on a single frame of the video content for example.

These and other embodiments allow for unique user experiences. For example, the gaming content may present the player with customized betting opportunities and awards. The various devices can determine the streaming video content through communicating with other devices directly, or other methods, such viewing a live video signal or listening to a live audio signal of the streaming video content, to determine if a user is watching a program or a commercial, for example, and information about the program and/or commercial. The system could also determine this information by synchronizing wirelessly with host for the remote streaming video host, a streaming video application running on a device within the system, such as a television or set top box.

In one embodiment, gaming content can be selected that has a theme or art style corresponding to the video content, and the game content can change to reflect changes in the video content. For example, during a normal story line of the video content, the gaming content may be a simple slot machine game having a default theme. At a particular point in the storyline, such as when a villain is introduced, the gaming content may change to add graphics for this villain and change the sounds accordingly. In another embodiment, the game content may change from a main game to a different or bonus game based on the video content. In addition to theme and game type, other examples of aspects of the game content that can be changed in response to the video content include payout odds, pay categories, availability of certain wins at certain times, betting limits (e.g., min/max bets), multipliers, play speed, and/or points awarded. In other embodiments, the game content, including the theme, rules and/or available awards, may be selected randomly.

In some embodiments, the gaming content may be exclusively tied to a particular portion of the content. For example, during an intense fight scene lasting 60 seconds as part of the video content, the gaming content may change to a skill fighting game during this time and informs the user that the game will end in 60 seconds, thereby creating urgency in the game which compliments the story line in the video content. For example, if the user is able to defeat the villain in the skill fighting game before the fight ends in the portion of the video content, the player may receive or unlock an award. In some examples, the gaming content may include other live players who are watching the same video content and/or playing the same game content.

In other embodiments, a user might be required to watch a certain combination of video content to unlock certain gaming content. For example, the player might have to watch every episode of a TV series to play a certain bonus game. In another example the player might have to watch a trilogy of movies to player certain gaming content. Unlocking the gaming content may also make the gaming content available independently of the video content.

In some embodiments, TV content has commercials where the story line stops, and users may also pause or stop content to take a break. Gaming content can be provided and changed accordingly, based on this information. For example, in response to determining that a user decreases focus on the gaming content during commercial breaks, the gaming content may response by alerting the user to vibrates or makes sounds and displays to the player that a video content themed bonus or progressive game is available.

Figure 8:
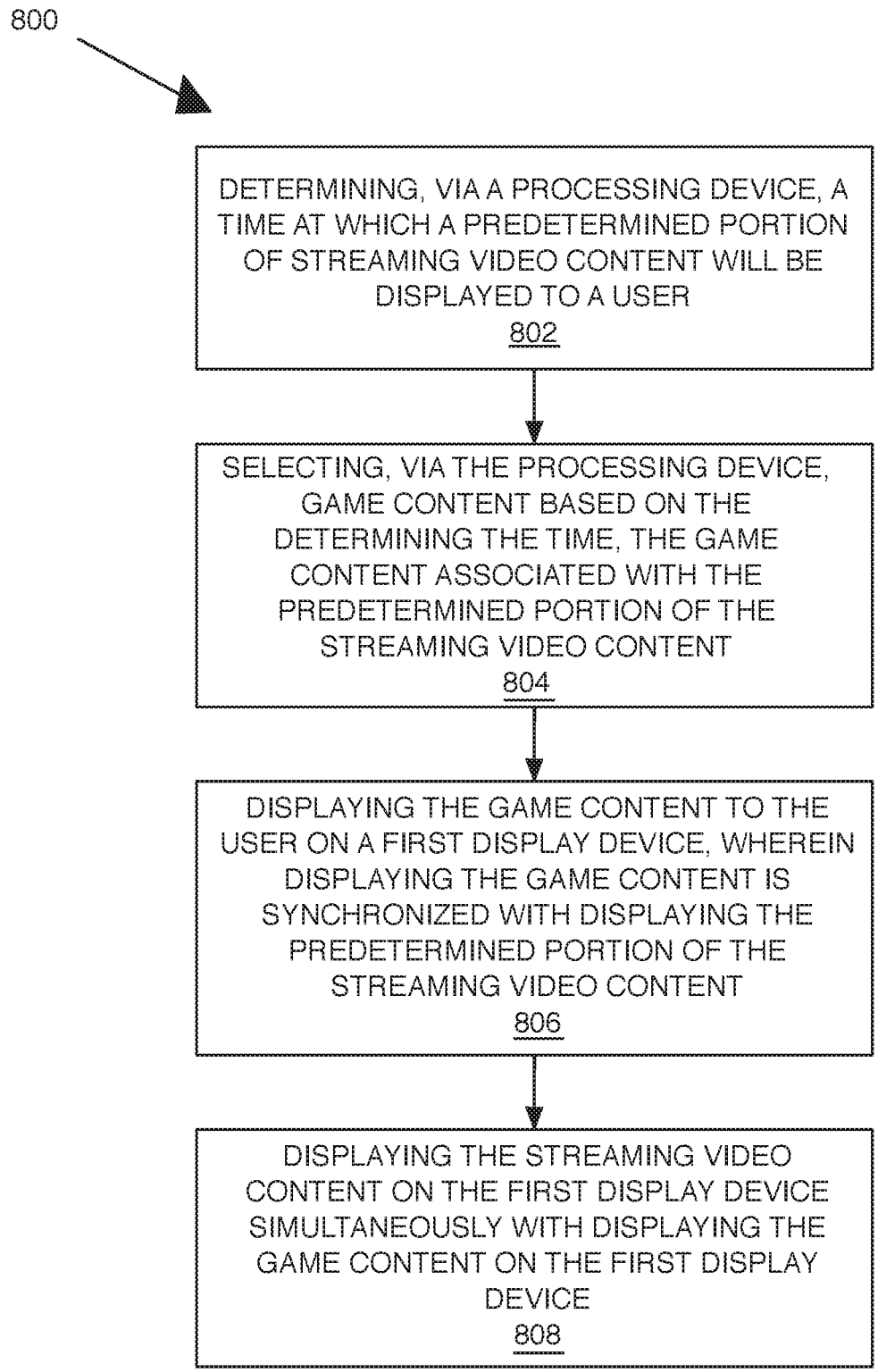
FIGS. 8 and 9 are flowcharts illustrating operations of systems/methods according to some embodiments.
Figure 9:
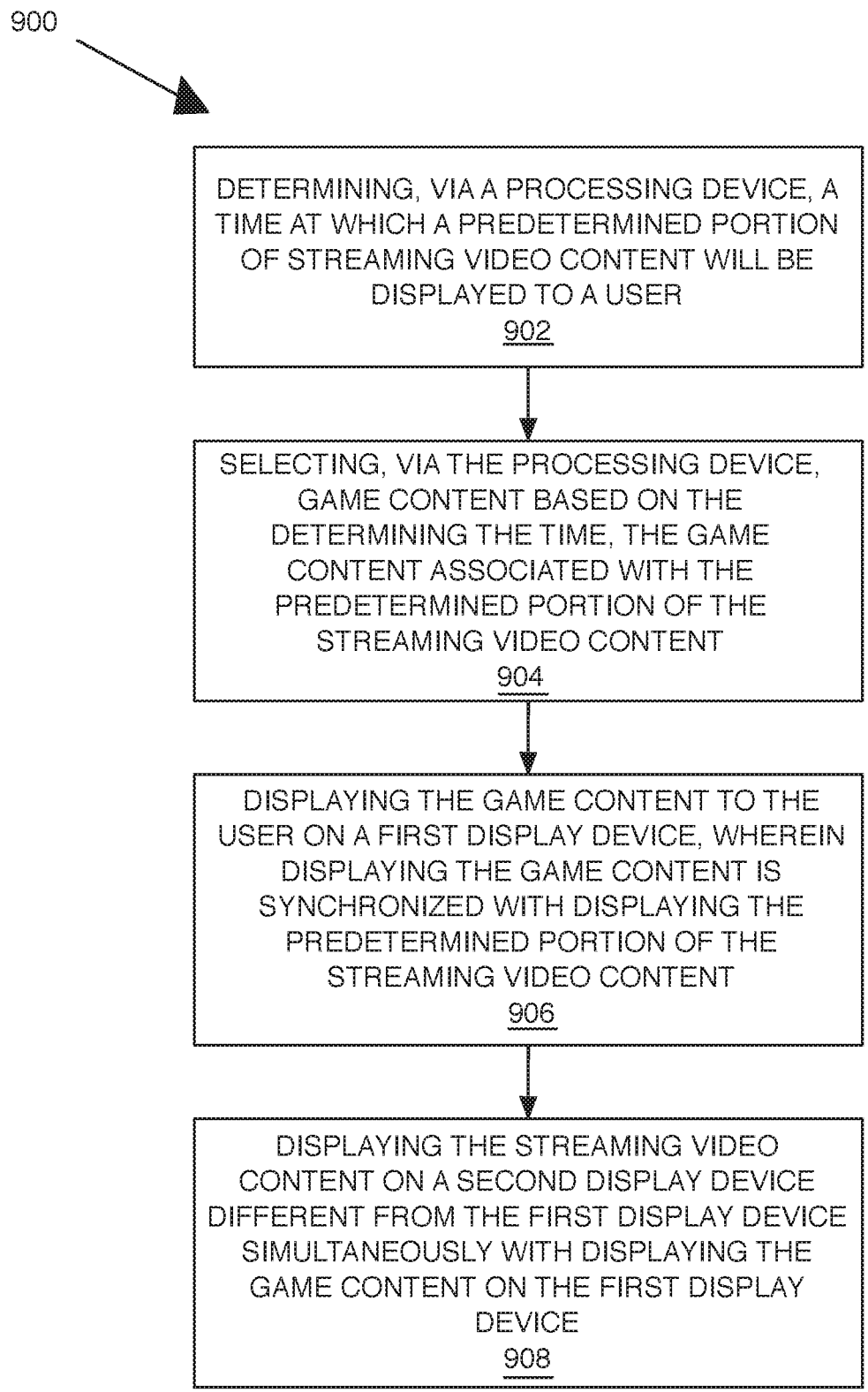

FIGS. 8 and 9 illustrate operations of the systems and/or components thereof disclosed herein according to some embodiments. Referring to FIG. 8, a method 800 includes determining, via a processing device, a time at which a predetermined portion of streaming video content will be displayed to a user (Block 802). The method 800 further includes selecting, via the processing device, game content based on the determining the time, the game content associated with the predetermined portion of the streaming video content (Block 804). The method 800 further includes displaying the game content to the user on a first display device, wherein displaying the game content is synchronized with displaying the predetermined portion of the streaming video content (Block 806). The method 800 further includes displaying the streaming video content on the first display device simultaneously with displaying the game content on the first display device (Block 808).

In some embodiments, displaying the game content may include overlaying the game content over a first portion of the streaming video content on the first display device. Alternatively, displaying the game content may include displaying the game content on the first display device separately from the streaming video content. In some embodiments, determining the time and selecting the game content are performed by a set-top box that includes the processing device coupled to the first display device.

Determining the time may include identifying a time stamp associated with the predetermined portion of the streaming video content. Identifying the time stamp may include inspecting a data stream containing the streaming video content in real time and identifying, based on the data stream, the time stamp. Determining the time may include identifying an image contained in a frame of the streaming video content associated with the time. For example, identifying the image may include generating a live video signal of a scene that includes the frame of the streaming video content and identifying, based on the live video signal, an image contained in the frame, such as by using image recognition software to identify the frame, or by detecting a portion of the image, such as an optical code within the frame representative of code data indicative of the time, for example.

In addition to or as part of providing the game content, a game result for the game content may be determined, and a monetary award, such as currency, credit, or cryptocurrencies, or a non-monetary award, such as a non-monetary prize, virtual currency or points, may be provided to the user based on the game result. For example, the game content may include a wagering game, a sports-betting or racing game, a skill-based game, or other type of game. In some embodiments, the award may be based at least in part on a player status of the user.

Referring to FIG. 9, a method 900 includes determining, via a processing device, a time at which a predetermined portion of streaming video content will be displayed to a user (Block 902). The method 900 further includes selecting, via the processing device, game content based on the determining the time, the game content associated with the predetermined portion of the streaming video content (Block 904). The method 900 further includes displaying the game content to the user on a first display device, wherein displaying the game content is synchronized with displaying the predetermined portion of the streaming video content (Block 906). The method 900 further includes displaying the streaming video content on a second display device different from the first display device simultaneously with displaying the game content on the first display device (Block 908).

In some embodiments, determining the time and selecting the game content may be performed by a set-top box comprising the processing device coupled to a second display device, such as a television or computer monitor. In some embodiments, the first display device may be a mobile device that displays the game content in response to receiving an instruction to display the game content transmitted from the set-top box or a remote server.

Figure 10:
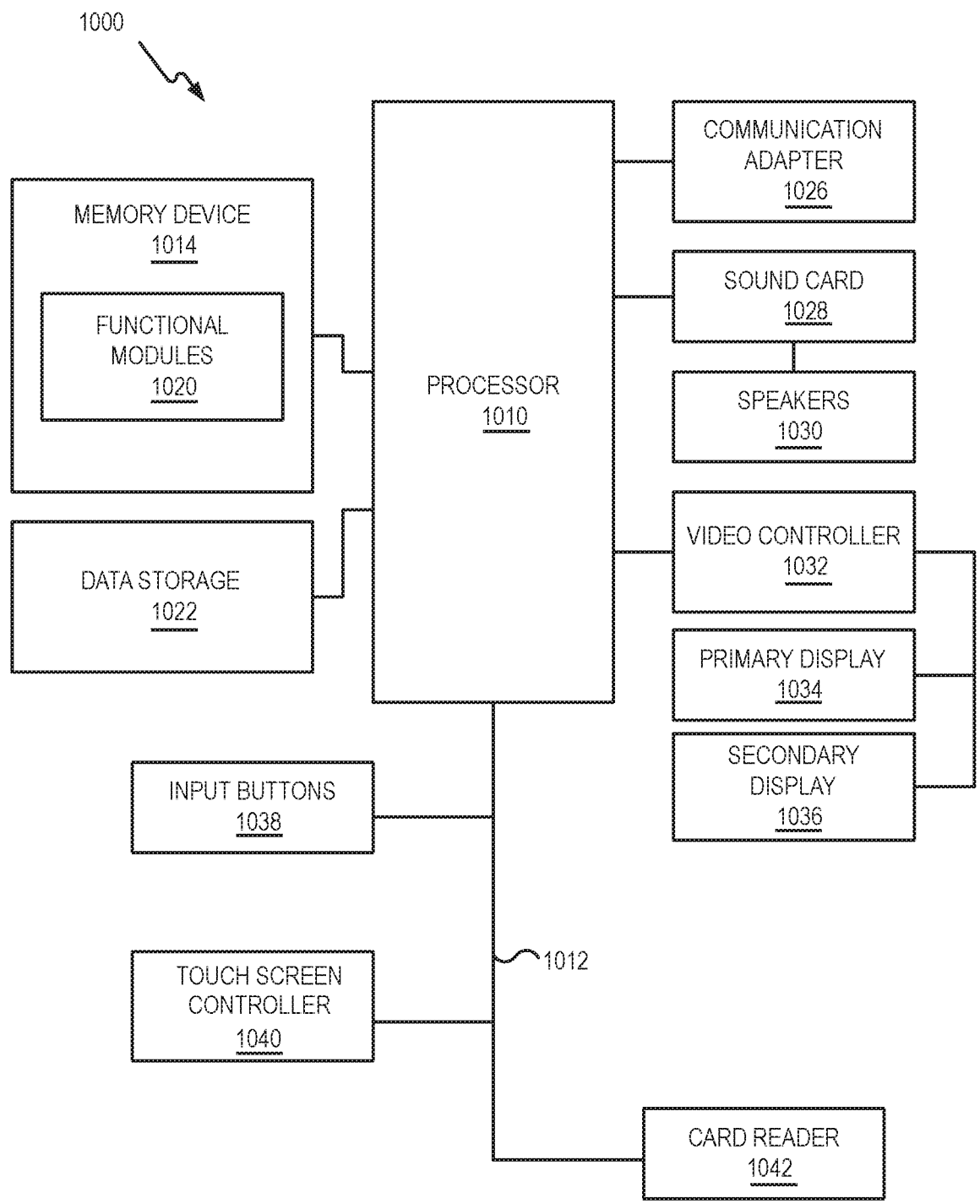
FIG. 10 is a schematic block diagram illustrating an electronic configuration for a display device according to some embodiments.

FIG. 10 is a block diagram that illustrates various components of a computing device 1000 according to some embodiments. The computing device 1000 of FIG. 10 and/or components thereof may be suitable for use as or in connection with various components of the devices, systems and methods described herein. As shown in FIG. 10, the computing device 1000 may include a processing circuit 1010 that controls operations of the computing device 1000. Although illustrated as a single processor, multiple special purpose and/or general purpose processors and/or processor cores may be provided in the computing device 1000. For example, the computing device 1000 may include one or more of a video processor, a signal processor, a sound processor and/or a communication controller that performs one or more control functions within the computing device 1000. The processing circuit 1010 may be variously referred to as a "controller," "microcontroller," "microprocessor" or simply a "computer." The processor may further include one or more application-specific integrated circuits (ASICs).

Various components of the computing device 1000 are illustrated in FIG. 10 as being connected to the processing circuit 1010. It will be appreciated that the components may be connected to the processing circuit 1010 through a system bus 1012, a communication bus and controller, such as a USB controller and USB bus, a network interface, or any other suitable type of connection.

The computing device 1000 further includes a memory device 1014 that stores one or more functional modules 1020 for performing the operations described above. The memory device 1014 may store program code and instructions, executable by the processing circuit 1010, to control the computing device 1000. The memory device 1014 may include random access memory (RAM), which can include non-volatile RAM (NVRAM), magnetic RAM (ARAM), ferroelectric RAM (FeRAM) and other forms as commonly understood in the gaming industry. In some embodiments, the memory device 1014 may include read only memory (ROM). In some embodiments, the memory device 1014 may include flash memory and/or EEPROM (electrically erasable programmable read only memory). Any other suitable magnetic, optical and/or semiconductor memory may operate in conjunction with the gaming device disclosed herein.

The computing device 1000 may further include a data storage device 1022, such as a hard disk drive or flash memory. The data storage 1022 may store program data, player data, audit trail data or any other type of data. The data storage 1022 may include a detachable or removable memory device, including, but not limited to, a suitable cartridge, disk, CD ROM, DVD or USB memory device.

The computing device 1000 may include a communication adapter 1026 that enables the computing device 1000 to communicate with remote devices over a wired and/or wireless communication network, such as a local area network (LAN), wide area network (WAN), cellular communication network, or other data communication network. The communication adapter 1026 may further include circuitry for supporting short range wireless communication protocols, such as Bluetooth and/or near field communications (NFC) that enable the computing device 1000 to communicate, for example, with a mobile communication device operated by a player.

The computing device 1000 may include one or more internal or external communication ports that enable the processing circuit 1010 to communicate with and to operate with internal or external peripheral devices, such as a sound card 1028 connected to speakers 1030, a video controller 1032 connected to a primary display 1034 and/or a secondary display 1036, input buttons 1038, a touch screen controller 1040, or a card reader 1042, for example. Additional internal or external peripheral devices that may be used include eye tracking devices, position tracking devices, cameras, accelerometers, arcade sticks, bar code readers, bill validators, biometric input devices, button panels, card readers, currency acceptors and dispensers, additional displays or video sources, expansion buses, information panels, keypads, lights, mass storage devices, microphones, motion sensors, motors, printers, reels, SCSI ports, solenoids, speakers, thumb drives, ticket readers, trackballs, touchpads, wheels, and wireless communication devices. In some embodiments, internal or external peripheral devices may communicate with the processing circuit through a universal serial bus (USB) hub (not shown) connected to the processing circuit 1010.

The present disclosure contemplates a variety of different systems and/or devices, each having one or more of a plurality of different features, attributes, or characteristics. In certain such embodiments, computerized instructions for controlling any features or content displayed by the display devices or other devices are executed by the central server, central controller, or remote host. In such "thin client" embodiments, the central server, central controller, or remote host remotely controls any games (or other suitable interfaces) displayed by the device, and the device is utilized to display such features (or suitable interfaces) and to receive one or more inputs or commands. In other such embodiments, computerized instructions for controlling any features displayed by the device are communicated from the central server, central controller, or remote host to the device and are stored in at least one memory device of the device. In such "thick client" embodiments, the at least one processor of the device executes the computerized instructions to control any games (or other suitable interfaces) displayed by the device.

In some embodiments in which the system includes: (a) a device configured to communicate with a central server, central controller, or remote host through a data network; and/or (b) a plurality of devices configured to communicate with one another through a data network, the data network is an internet or an intranet. In certain such embodiments, an internet browser of the device is usable to access an internet game page from any location where an internet connection is available. In one such embodiment, after the internet content page is accessed, the central server, central controller, or remote host identifies a user prior to enabling that user to use particular features. In one example, the central server, central controller, or remote host identifies the user by requiring a user account of the user to be logged into via an input of a unique username and password combination assigned to the user. It should be appreciated, however, that the central server, central controller, or remote host may identify the user in any other suitable manner, such as by validating a user tracking identification number associated with the user; by reading a user tracking card or other smart card inserted into a card reader (as described below); by validating a unique user identification number associated with the user by the central server, central controller, or remote host; or by identifying the device, such as by identifying the MAC address or the IP address of the internet facilitator. In various embodiments, once the central server, central controller, or remote host identifies the user, the central server, central controller, or remote host enables features and/or content, and displays the features and/or content via the internet browser of the EGM.

It should be appreciated that the central server, central controller, or remote host and the device(s) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of devices from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with users.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A computer-implemented method comprising:
   determining, via a processing device, a time at which a predetermined portion of streaming video content will be displayed to a user;
   selecting, via the processing device, game content based on the determining the time, the game content associated with the predetermined portion of the streaming video content;
   determining whether the user has unlocked the game content to be displayed, wherein determining whether the user has unlocked the game content comprises determining whether the user has watched a set of streaming video content; and
   displaying the game content to the user on a first display device in response to determining that the user has unlocked the game content, wherein displaying the game content is synchronized with displaying the predetermined portion of the streaming video content.

2. The computer-implemented method of claim 1, wherein the game content is displayed for a predetermined period of time beginning at the time at which the predetermined portion of streaming video content will be displayed to the user.

3. The computer-implemented method of claim 2, wherein the game content is exclusive to the predetermined portion of the streaming video content and the game content comprises an objective limited to completion during the predetermined period of time.

4. A gaming device comprising:
   a processor circuit;
   a display device; and
   a memory coupled to the processor circuit, the memory comprising machine-readable instructions that, when executed by the processor circuit, cause the processor circuit to:
   determine a time at which a predetermined portion of streaming video content will be displayed to a user;
   select game content based on the time, the game content associated with the predetermined portion of the streaming video content;
   determine whether the user has unlocked the game content to be displayed, wherein determining whether the user has unlocked the game content comprises determining whether the user has watched a set of streaming video content; and
   cause the game content to be displayed to the user on the display device in response to determining that the user has unlocked the game content, wherein displaying the game content is synchronized with displaying the predetermined portion of the streaming video content.

5. A gaming system comprising:
   a processor circuit; and
   a memory coupled to the processor circuit, the memory comprising machine-readable instructions that, when executed by the processor circuit, cause the processor circuit to:
   determine a time at which a predetermined portion of streaming video content will be displayed to a user;
   select game content based on the time, the game content associated with the predetermined portion of the streaming video content;
   determine whether the user has unlocked the game content to be displayed, wherein determining whether the user has unlocked the game content comprises determining whether the user has watched a set of streaming video content; and
   cause the game content to be displayed to the user on a first display device in response to determining that the user has unlocked the game content, wherein displaying the game content is synchronized with displaying the predetermined portion of the streaming video content.

6. The gaming system of claim 5, wherein the machine-readable instructions further cause the processor circuit to:
   cause the streaming video content to be displayed on the first display device simultaneously with displaying the game content on the first display device.

7. The gaming system of claim 6, wherein the machine-readable instructions that cause the processor circuit to display the game content further cause the processor circuit to overlay the game content over a first portion of the streaming video content on the first display device.

8. The gaming system of claim 6, wherein the machine-readable instructions that cause the processor circuit to display the game content further cause the processor circuit to display the game content on the first display device separately from the streaming video content.

9. The gaming system of claim 5, wherein the machine-readable instructions further cause the processor circuit to:
   display the streaming video content on a second display device different from the first display device simultaneously with displaying the game content on the first display device.

10. The gaming system of claim 5, further comprising a set-top box comprising the processor circuit coupled to a second display device,
    wherein the machine-readable instructions further cause the processor circuit to display the streaming video content on the second display device.

11. The gaming system of claim 10, further comprising mobile device comprising the first display device.

12. The gaming system of claim 5, further comprising a set-top box comprising the processor circuit coupled to the first display device,
    wherein the machine-readable instructions further cause the processor circuit to display the streaming video content on the first display device.

13. The gaming system of claim 5, wherein the machine-readable instructions that cause the processor circuit to determine the time further cause the processor circuit to identify a time stamp associated with the predetermined portion of the streaming video content.

14. The gaming system of claim 13, wherein the machine-readable instructions that cause the processor circuit to identify a time stamp further cause the processor circuit to:
   inspect a data stream containing the streaming video content in real time; and
   identify, based on the data stream, the time stamp.

15. The gaming system of claim 5, wherein the machine-readable instructions that cause the processor circuit to determine the time further cause the processor circuit to identify an image contained in a frame of the streaming video content associated with the time.

16. The gaming system of claim 15, wherein the machine-readable instructions that cause the processor circuit to identify the image further cause the processor circuit to
   generate a live video signal of a scene that includes the frame of the streaming video content; and
   identify, based on the live video signal, an image contained in the frame.

17. The gaming system of claim 15, wherein the image is an optical code representative of code data indicative of the time.

18. The gaming system of claim 5, wherein the machine-readable instructions further cause the processor circuit to:
   determine a game result for the game content; and
   provide an award to the user based on the game result.

19. The gaming system of claim 18, wherein the game content comprises a wagering game, and wherein the award comprises a monetary award.

20. The gaming system of claim 5, wherein the game content is exclusive to the predetermined portion of the streaming video content and the game content comprises an objective limited to completion during the display of the predetermined portion of the streaming video content.

* * * * *